United States Patent
Xu

(10) Patent No.: US 11,211,867 B2
(45) Date of Patent: Dec. 28, 2021

(54) VOLTAGE REGULATING APPARATUS WITH PRE-STAGE CIRCUIT AND POST-STAGE CIRCUIT

(71) Applicant: FSP-Powerland Technology Inc., Nanjing (CN)

(72) Inventor: Ming Xu, Nanjing (CN)

(73) Assignee: FSP-Powerland Technology Inc., Nanjing (CN)

( * ) Notice: Subject to any disclaimer, the term of this patent is extended or adjusted under 35 U.S.C. 154(b) by 28 days.

(21) Appl. No.: 16/745,373

(22) Filed: Jan. 17, 2020

(65) Prior Publication Data
US 2020/0235670 A1 Jul. 23, 2020

(30) Foreign Application Priority Data
Jan. 18, 2019 (CN) .......................... 201910055913.6

(51) Int. Cl.
*H02M 3/158* (2006.01)
*H02M 1/00* (2006.01)

(52) U.S. Cl.
CPC .......... *H02M 3/1584* (2013.01); *H02M 1/007* (2021.05); *H02M 3/1586* (2021.05)

(58) Field of Classification Search
CPC ....... H02M 3/1584; H02M 2003/1586; H02M 2001/007
See application file for complete search history.

(56) References Cited

U.S. PATENT DOCUMENTS

| | | | | |
|---|---|---|---|---|
| 8,269,141 B2* | 9/2012 | Daniel | ................. | B23K 9/1006 219/130.1 |
| 9,878,635 B1* | 1/2018 | Khaligh | .................... | B60L 3/12 |
| 10,608,539 B1* | 3/2020 | Huang | ................. | H02M 3/1584 |
| 2006/0125457 A1* | 6/2006 | Lin | ...................... | H02M 3/1584 323/282 |
| 2006/0226130 A1* | 10/2006 | Kooken | ............... | B23K 9/1056 219/130.1 |
| 2007/0001653 A1* | 1/2007 | Xu | ......................... | H02M 3/158 323/225 |
| 2009/0039843 A1* | 2/2009 | Kudo | .................. | H02M 3/1584 323/272 |
| 2010/0171476 A1* | 7/2010 | Philpott | ................. | H02M 3/158 323/282 |
| 2016/0172976 A1* | 6/2016 | Mu | ........................ | H02M 7/487 323/271 |
| 2016/0226385 A1* | 8/2016 | Phadke | ................. | H02M 3/335 |
| 2020/0076440 A1* | 3/2020 | Ng | ........................... | H03L 7/081 |
| 2020/0083805 A1* | 3/2020 | Mauri | ..................... | H02M 3/07 |

* cited by examiner

*Primary Examiner* — Gustavo A Rosario-Benitez

(57) ABSTRACT

The present disclosure discloses a voltage regulating apparatus, including a pre-stage circuit and a post-stage circuit. The pre-stage circuit receives an input voltage and outputs an intermediate bus voltage, and the post-stage circuit receives the intermediate bus voltage and outputs an output voltage. The post-stage circuit includes a plurality of post-stage converters, the post-stage converters are connected in parallel in an interleaved manner. In this way, the post-stage circuit has a small inductance, thereby reducing the volume of the apparatus and increasing the power density of the apparatus.

7 Claims, 2 Drawing Sheets

VOLTAGE REGULATING APPARATUS WITH PRE-STAGE CIRCUIT AND POST-STAGE CIRCUIT

CROSS REFERENCE TO RELATED APPLICATION

The present application is related to and claims the benefit of priority to Chinese Patent Application No. 2019100559136, entitled "Voltage Regulating Apparatus", filed with SIPO on Jan. 18, 2019, the contents of which are incorporated herein by reference in its entirety.

BACKGROUND

Field of Disclosure

The present disclosure relates to the technical field of power supply, and in particular, to a voltage regulating apparatus.

Description of Related Arts

The power consumption of a microprocessor is approximately proportional to the square of a supply voltage and a working frequency of the microprocessor. With the increase of the primary frequency of the microprocessor, the supply voltage of the microprocessor needs to be reduced to reduce the power consumption. In order to obtain a faster operational speed and ensure that the microprocessor has higher power requirements, the power supply current of the microprocessor also needs to be increased. The development trend of new-generation computer microprocessors is to have a low voltage and a high current. The working voltage is as low as 1 V or even less than 1 V, and the working current is as high as 130 A. Microprocessors used in some servers even require a current of 170 A. As the operational speed of the microprocessor increases, a change rate di/dt of the required supply current is larger. In this case, a voltage regulator module (VRM) that supplies power to the microprocessor needs to have a sufficient dynamic response speed.

With the rapid development of the information industry, point-of-load (POL) converters with high efficiency and high dynamic characteristics are increasingly applied. The VRM is a special POL converter. As users have higher requirements for microprocessors, the requirements for VRMs by microprocessors are more stringent. Low voltage, high current, high power density and high dynamic characteristics are main indicators in design of the VRM.

SUMMARY OF THE PRESENT DISCLOSURE

The present disclosure provides a voltage regulating apparatus, to optimally realize low voltage, high current, high power density and high dynamic characteristics of the voltage regulating apparatus.

The present disclosure provides a voltage regulating apparatus, including a pre-stage circuit and a post-stage circuit, the pre-stage circuit receives an input voltage and outputs an intermediate bus voltage, and the post-stage circuit receives the intermediate bus voltage and outputs an output voltage, the voltage regulating apparatus further includes a pre-stage driving circuit, the pre-stage driving circuit samples the output voltage and an intermediate bus current to generate a pre-stage driving signal that drives the pre-stage circuit, and the pre-stage driving circuit regulates a duty cycle of the pre-stage driving signal according to the output voltage.

The post-stage circuit comprises n interleaved post-stage converters connected in parallel, and the intermediate bus voltage is n times the output voltage, a voltage value of the output voltage Vo includes 1 V or 0.75 V.

The post-stage converter comprises a post-stage switching circuit and a post-stage inductor.

The voltage regulating apparatus further comprises a post-stage driving circuit, where the post-stage driving circuit generates a post-stage driving signal that drives a switch in the post-stage switching circuit, a duty cycle of the post-stage driving signal being fixed.

The post-stage converters are interleaved and connected in parallel, and are phase staggered by 360°/n.

The post-stage driving signal controls a conduction time of a primary switching transistor in the post-stage switching circuit to be Ts/n, Ts being a sum of conduction times of primary switches in first to nth switching circuits, and the duty cycle of the post-stage driving signal is not regulable.

A switching frequency of the primary switching transistor in the post-stage switching circuit is 600 KHZ to 2 MHZ.

The post-stage inductors are integrated through magnetic integrating.

The pre-stage circuit includes a plurality of buck conversion circuits connected in parallel, and inductors of the buck conversion circuits are coupled in pairs.

The post-stage converter is a buck converter or a boost converter.

The present disclosure has the following beneficial effects: the output current ripple of the post-stage conversion circuit is zero, so that the inductance of the inductor of the post-stage conversion circuit is small, thereby reducing the volume of the circuit and increasing the power density. In addition, inductors are integrated by using a magnetic integration technology, so that the leakage inductance is small and the response speed of the circuit is faster.

To make the above features and advantages of the disclosure clear and easy to understand, the following gives a detailed description of embodiments with reference to accompanying drawings.

DETAILED DESCRIPTION OF THE PREFERRED EMBODIMENTS

To make the purpose and technical solutions of the embodiments of the present disclosure clearer, the following clearly and completely describes the technical solutions of the embodiments of the present disclosure with reference to the accompanying drawings in the embodiments of the present disclosure. Apparently, the described embodiments are merely some rather than all of the embodiments of the present disclosure. All other embodiments obtained by those of ordinary skill in the art based on the described embodiments of the present disclosure without creative efforts shall fall within the protection scope of the present disclosure.

Figure 1:
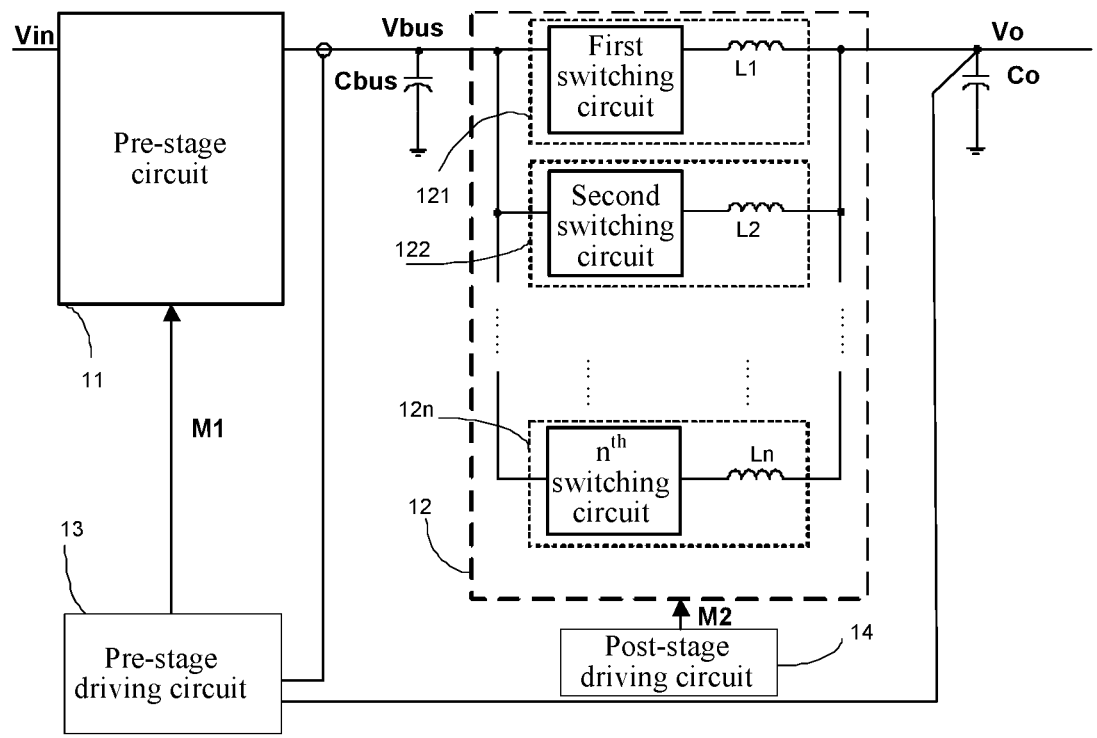
FIG. 1 is a schematic diagram of a voltage regulating apparatus according to the present disclosure.

As shown in FIG. 1, the voltage regulating apparatus of the present disclosure includes a pre-stage circuit 11 and a post-stage circuit 12. The pre-stage circuit 11 receives an input voltage Vin and outputs an intermediate bus voltage Vbus. The post-stage circuit receives the intermediate bus voltage Vbus and outputs an output voltage Vo. The voltage regulating apparatus further includes a pre-stage driving circuit 13, the pre-stage driving circuit 13 samples the output voltage Vo and an intermediate bus current Ibus to generate a pre-stage driving signal M1. More specifically, the pre-stage circuit 11 is a switching circuit, the pre-stage driving signal M1 is a driving signal of a switch in the pre-stage circuit 11, a duty cycle of the pre-stage driving signal M1 changes according to the output voltage Vo, thereby regulating the intermediate bus voltage Vbus.

The post-stage circuit 12 includes n post-stage converters 121-12n connected in parallel, duty cycles of the post-stage converters 121-12n are fixed. The intermediate bus voltage Vbus and the output voltage Vo have a proportional relationship Vbus=n*Vo, which is an approximate proportional relationship and may not be exactly equal in practical applications. Preferably, a voltage value of the output voltage Vo is 1 V or 0.75 V.

Figure 3:
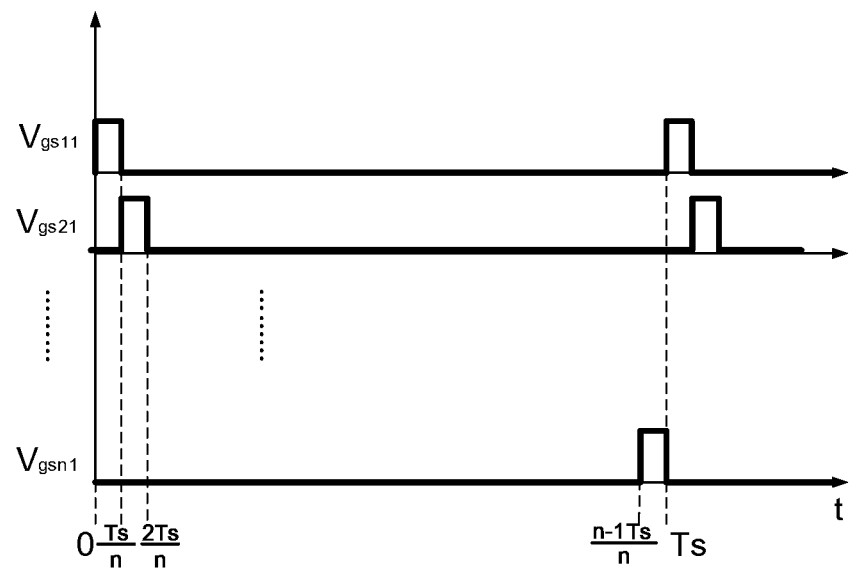
FIG. 3 is a key waveform diagram output by a post-stage driving circuit of the voltage regulating apparatus according to the present disclosure.

The post-stage converters 121-12n are interleaved and connected in parallel, and are phase staggered by 360°/n, including first to $n^{th}$ switching circuits and inductors L1-Ln. The $n^{th}$ switching circuit and the inductor Ln are connected in series. The voltage regulating apparatus further includes a post-stage driving circuit 14, the post-stage driving circuit 14 outputs a post-stage driving signal M2, and the post-stage driving signal M2 controls a conduction time of a primary switching transistor in the $n^{th}$ switching circuit to be Ts/n. Preferably, a switching frequency of the primary switching transistor in the $n^{th}$ switching circuit is 600 KHZ to 2 MHZ. Referring to FIG. 3, adjacent primary switching circuits are phase staggered by 360°/n, and Ts is a sum of conduction times of primary switches in the first to $n^{th}$ switching circuits. The duty cycles of the post-stage converters 121-12n are controlled to be not regulable. In this driving manner, an output current ripple of a post-stage conversion circuit 12 is zero, so that inductances of the inductors L1-Ln are small, thereby reducing the volume of the circuit and increasing the power density. The inductors L1-Ln are integrated by using a magnetic integration technology, so that a leakage inductance is small and a response speed of the circuit is faster.

Figure 2:
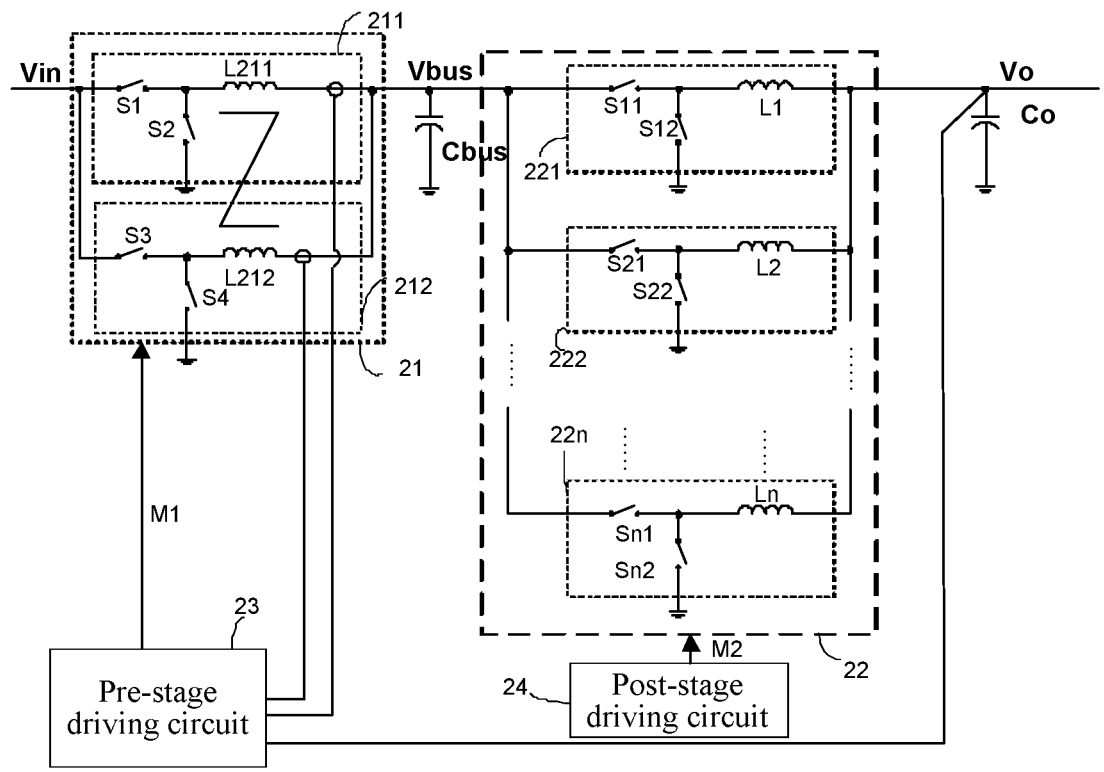
FIG. 2 is a specific embodiment of the voltage regulating apparatus according to the present disclosure.

FIG. 2 shows a preferred embodiment of the present disclosure. A pre-stage conversion circuit 21 includes a plurality of buck conversion circuits connected in parallel, and only two buck conversion circuits connected in parallel are used as an example for description in this embodiment. A buck conversion circuit 211 includes switches S1 and S2 and an inductor L211, and the switches S1 and S2 and the inductor L211 form a buck circuit. A buck conversion circuit 212 includes switches S3 and S4 and an inductor L212, and the switches S3 and S4 and the inductor L212 form a buck circuit. Magnetic coupling is performed between the inductor L211 and the inductor L212, thereby implementing current equalization of output currents of the buck conversion circuit 211 and the buck conversion circuit 212. A pre-stage driving circuit 23 samples an output current Ibus1 of the buck conversion circuit 211 and an output current Ibus2 of the buck conversion circuit 212, and generates, according to the output current Ibus1, the output current Ibus2, and the output voltage Vo, a driving signal for controlling switches S1-S4 of the pre-stage conversion circuit 21.

Figure 4:
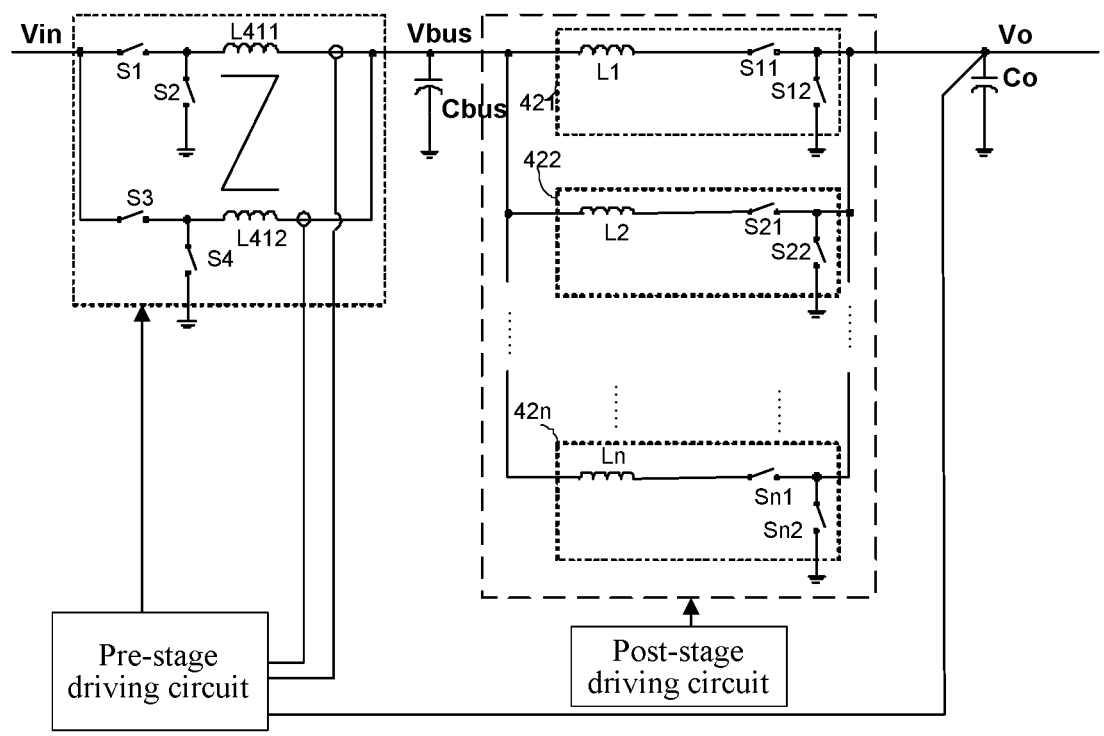
FIG. 4 is another specific embodiment of the voltage regulating apparatus according to the present disclosure.

In this embodiment, the post-stage conversion circuit 22 includes n buck converters, and buck converters 221-22n are interleaved and connected in parallel. The buck converter 22n includes a primary control switch Sn1, a synchronous rectifier switch Sn2, and an inductor Ln. The primary control switch Sn1, the synchronous rectifier switch Sn2, and the inductor Ln form a buck circuit. However, this is not limited in the present disclosure. As shown in FIG. 4, the primary control switch Sn1, the synchronous rectifier switch Sn2, and the inductor Ln form a boost circuit.

According to a voltage regulating circuit of the present disclosure, an output current ripple of a post-stage conversion circuit is zero, so that an inductance of an inductor of the post-stage conversion circuit is small, thereby reducing the volume of the circuit and increasing the power density. In addition, inductors are integrated by using a magnetic integration technology, so that a leakage inductance is small and a response speed of the circuit is faster.

Although the disclosure is described with reference to the above embodiments, the embodiments are not intended to limit the disclosure. Those skilled in the art can make modifications or changes to the above-mentioned embodiments without going against the principle and the range of the present disclosure. Therefore, the protection scope of the disclosure should be subject to the appended claims.

What is claimed is:

1. A voltage regulating apparatus, comprising
   a pre-stage circuit to receive an input voltage and output an intermediate bus voltage,
   wherein the pre-stage circuit comprises a plurality of conversion circuits connected in parallel,
   wherein inductors of the conversion circuits are magnetically coupled, so that output currents of the conversion circuits are equalized;
   a post-stage circuit to receive the intermediate bus voltage and output an output voltage,
   wherein the post-stage circuit comprises n interleaved post-stage converters connected in parallel, and the intermediate bus voltage is n times the output voltage,
   wherein the post-stage converters are interleaved and phase staggered by 360°/n,
   wherein a duty cycle of the post-stage converters is not regulable,
   wherein an output current ripple of the post-stage circuit is zero; and
   a pre-stage driving circuit to sample the output voltage and an intermediate bus current, to generate a pre-stage driving signal that drives the pre-stage circuit, and to regulate a duty cycle of the pre-stage driving signal according to the output voltage.

2. The voltage regulating apparatus as in claim 1, wherein a post stage converter of the n interleaved post-stage converters comprises a post-stage switching circuit and a post-stage inductor.

3. The voltage regulating apparatus as in claim 2, further comprising
   a post-stage driving circuit, wherein the post-stage driving circuit generates a post-stage driving signal.

4. The voltage regulating apparatus as in claim 3, wherein the post-stage driving signal controls a conduction time of a primary switching transistor in the post-stage switching circuit to be Ts/n, and Ts is a sum of conduction times of primary switching transistors in first to nth switching circuits of the post-stage circuit.

5. The voltage regulating apparatus as in claim 4, wherein a switching frequency of the primary switching transistor in the post-stage switching circuit is 600 KHZ to 2 MHZ.

6. The voltage regulating apparatus as in claim 4, wherein the post-stage converter is a boost converter.

7. The voltage regulating apparatus as in claim 4, wherein the post-stage converter is a buck converter.

* * * * *